United States Patent [19]

Landmesser

[11] Patent Number: 5,013,082
[45] Date of Patent: May 7, 1991

[54] DOOR OPENING SYSTEM
[75] Inventor: Franklin D. Landmesser, Troy, Mich.
[73] Assignee: General Motors Corporation, Detroit, Mich.
[21] Appl. No.: 558,276
[22] Filed: Jul. 26, 1990
[51] Int. Cl.⁵ .............................................. B60J 5/04
[52] U.S. Cl. .................................................. 296/202
[58] Field of Search ............... 296/56, 202, 146, 909, 296/910; 49/253

[56] References Cited

U.S. PATENT DOCUMENTS

| | | | |
|---|---|---|---|
| 2,464,696 | 3/1949 | Lelong | 296/201 |
| 2,551,054 | 5/1951 | Sanmori | 296/44 |
| 2,903,296 | 9/1959 | Barenyi | 296/44 |
| 2,938,749 | 5/1960 | Podolan et al. | 296/44 |
| 3,511,530 | 5/1970 | Barenyi | 296/146 |
| 3,693,997 | 9/1972 | Dreyer | 296/146 X |
| 4,017,117 | 4/1977 | Eggert, Jr. | 296/146 |
| 4,378,658 | 4/1983 | DeLorean | 49/379 |
| 4,641,881 | 2/1987 | Nomura et al. | 296/146 X |
| 4,684,167 | 8/1987 | Newmayer | 296/202 |

FOREIGN PATENT DOCUMENTS

| | | | |
|---|---|---|---|
| 57327 | 3/1988 | Japan | 296/146 |
| 902405 | 8/1962 | United Kingdom | 296/146 |

Primary Examiner—Margaret A. Focarino
Assistant Examiner—Gary C. Hoge
Attorney, Agent, or Firm—Charles E. Leahy

[57] ABSTRACT

A motor vehicle has a door opening adjacent an occupant seat and a cowl structure extending transversely across the vehicle body forward of a windshield opening. A door provided for closing the door opening is mounted on a door support arm having an inboard end pivotally mounted on the cowl structure and an outboard end connected to the door so that pivotal movement of the support arm bodily swings the door vertically between a lowered closed position and a raised open position. The support arm is preferably mounted on the vehicle cowl structure by a pivot located closely adjacent the center line of the vehicle body and the support arm is configured to fit flush with the surface of the cowl structure and hood of the vehicle body. A guide link extends generally parallel with the support link and has an inboard end pivotally mounted on the cowl structure and an outboard end pivotally mounted on the door so that the guide link controls the pivotal movement of the door in relation to the outboard end of the support arm.

4 Claims, 2 Drawing Sheets

DOOR OPENING SYSTEM

The invention relates to a vehicle door opening system and more particularly to a support arm having an inboard end pivotally mounted on the cowl structure of the vehicle closely adjacent the center line of the vehicle for bodily raising and lowering the door between opened and closed positions.

BACKGROUND OF THE INVENTION

It is well known in motor vehicles to situate a door opening adjacent the occupant seat and employ a hingedly mounted door for selectively opening and closing the door opening. It is known to mount the door on hinges which hingedly mounted the top edge of the door to the vehicle roof so that the door swings outwardly and upwardly to an open position.

A disadvantage of the aforedescribed top hinged door is that the bottom edge of the door swings out substantially from the side of the vehicle so that a substantial clearance space is required along side the vehicle in order to permit opening of the door.

It would be desirable to provide a vehicle door opening system in which the vehicle door would swing more nearly in the pure vertical direction upwardly to open the door opening without requiring substantial clearance space along side the vehicle.

SUMMARY OF THE INVENTION

According to the present invention, a motor vehicle has a door opening adjacent an occupant seat and a cowl structure extending transversely across the vehicle body forward of a windshield opening. A door provided for closing the door opening is mounted on a door support arm having an inboard end pivotally mounted on the cowl structure and an outboard end connected to the door so that pivotal movement of the support arm bodily swings the door vertically between a lowered closed position and a raised open position. The support arm is preferably mounted on the vehicle cowl structure by a pivot located closely adjacent the center line of the vehicle body and the support arm is configured to fit flush with the surface of the cowl structure and hood of the vehicle body. A guide link extends generally parallel with the support link and has an inboard end pivotally mounted on the cowl structure and an outboard end pivotally mounted on the door so that the guide link controls the pivotal movement of the door in relation to the outboard end of the support arm.

Accordingly, the object, feature and advantage of the invention resides in the provision of a vehicle door mounted on a support arm having an inboard end pivotally attached to the vehicle cowl structure generally adjacent the vehicle centerline.

Another object, feature and advantage of the invention resides in the provision of a support arm having an inboard end pivotally mounted on the vehicle body adjacent the vehicle centerline and an outboard end pivotally mounted on the door, with an associated guide link having its ends respectively pivotally mounted on the body and door to control the attitude of the door during said movement thereof between opened and closed positions by the support arm.

BRIEF DESCRIPTION OF THE DRAWING

These and other features, objects, and advantages of the invention will become apparent upon consideration of the description of the preferred embodiment and the appended drawings in which.

DESCRIPTION OF THE PREFERRED EMBODIMENT

Figure 1:
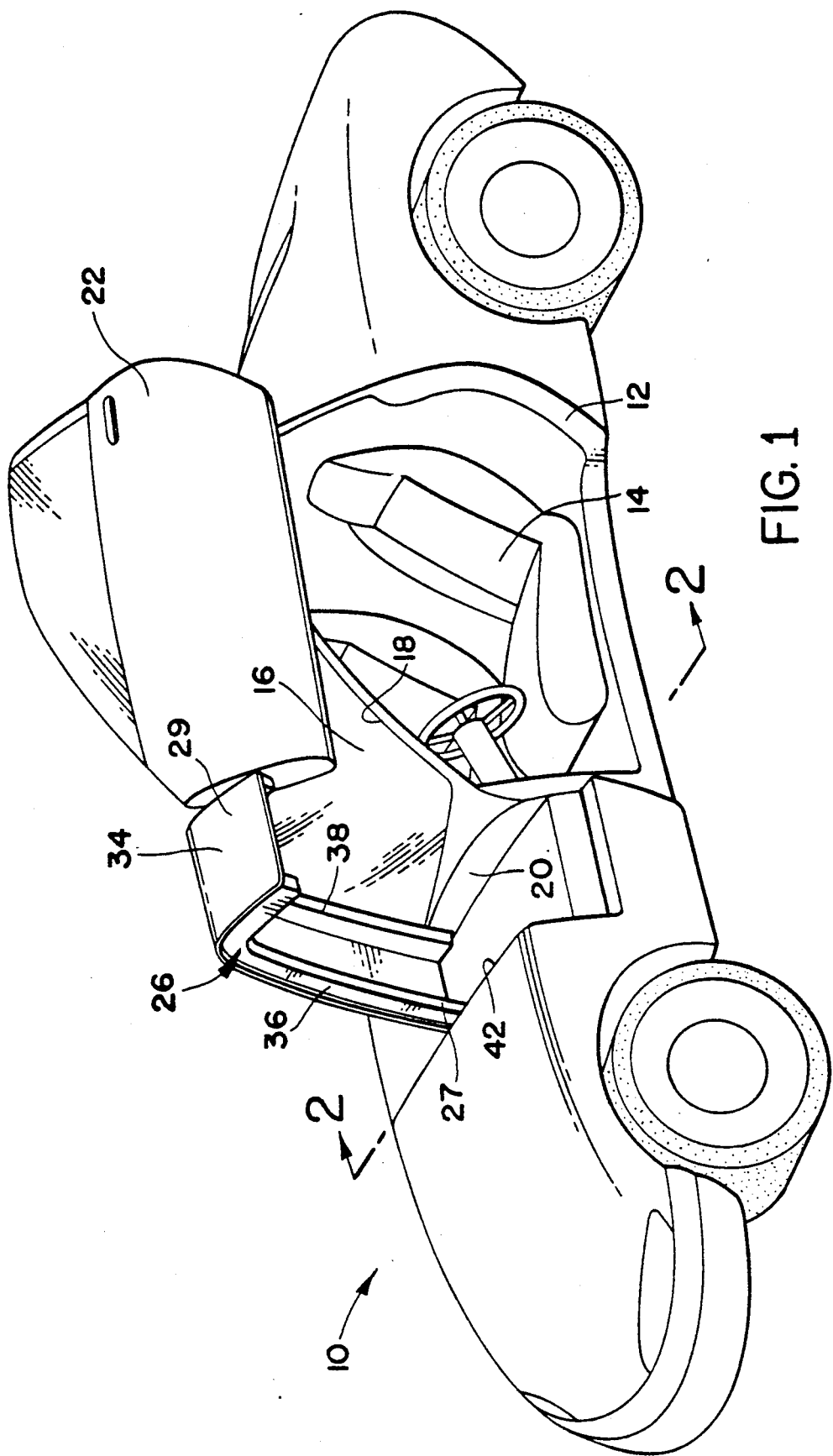
FIG. 1 is a perspective view of a motor vehicle door opening system according to the invention.

Referring to FIG. 1, there is shown a motor vehicle 10 having a vehicle body including a door opening 12 provided adjacent an occupant seat 14. The vehicle body also includes a windshield 16 which is mounted within a windshield opening 18 defined in part by a cowl structure or bulkhead 20 which extends transversely across the car adjacent the front edge of the door opening 12. A vehicle door 22 is provided for closing the door opening 12.

Figure 2:
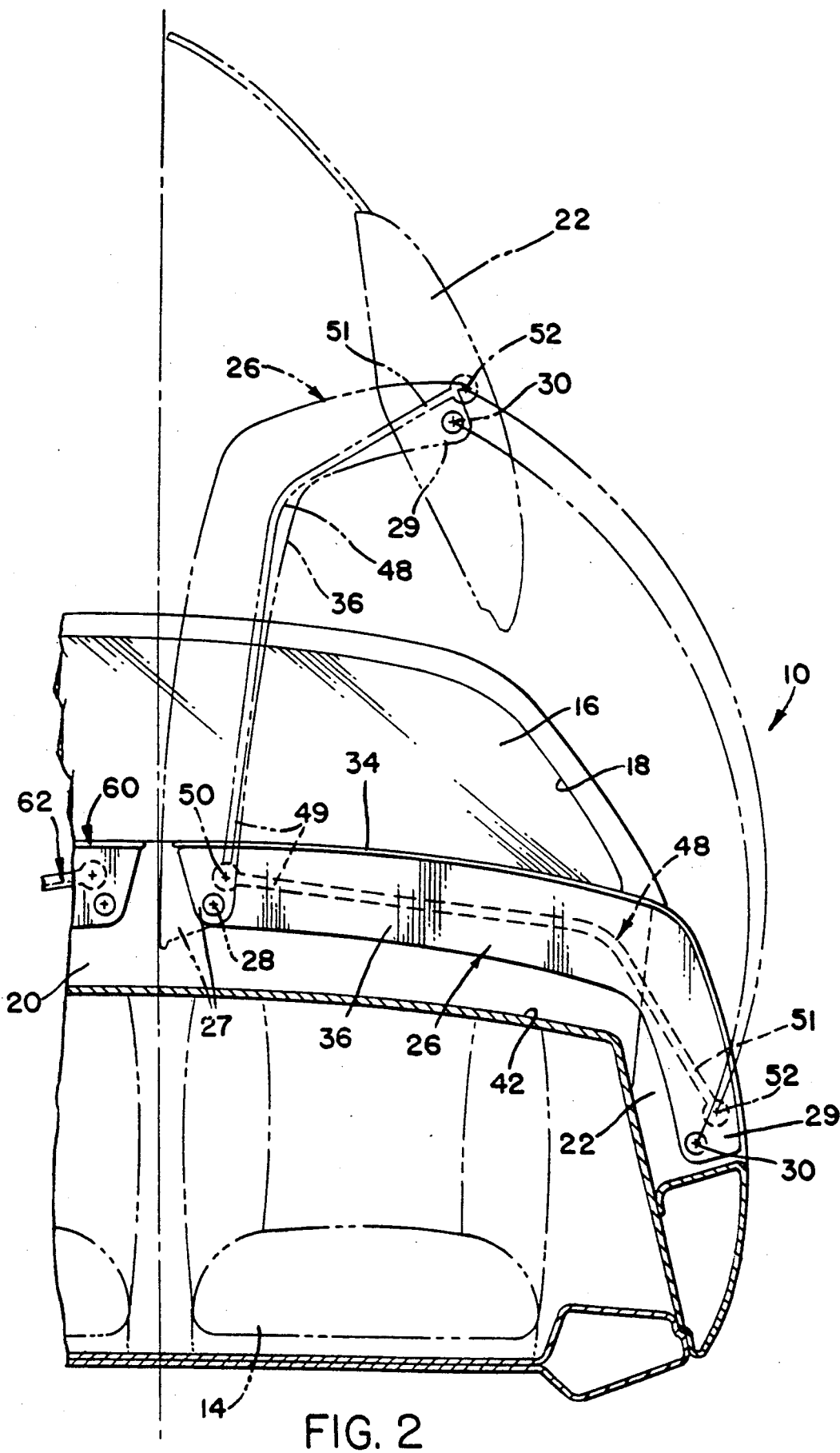
FIG. 2 is a sectional view taken in the direction of arrows 2—2 of FIG. 1 showing the vehicle door in the closed position and showing the opened position indicated in phantom line.

The door 22 is hinged for movement between the open position of FIG. 1 and closed position of FIG. 2 by a support arm 26. The support arm 26 has an inboard end 27 which is pivotally mounted on the cowl structure by a pivot shaft 28 located closely adjacent the centerline of the vehicle body and an outboard end 29 which is pivoted on the front part of door 22 by a pivot shaft 30. As best seen in FIG. 1, the support arm 26 is a welded assembly comprised of a sheet metal panel 34 reinforced by forward frame 36 and rearward frame 38. When the door is closed, as shown in FIG. 2, the support arm 26 stores within a recess 42 provided in the cowl structure 20 and the sheet metal panel 34 fits flush with the surface of the cowl structure, forming a contiguous aesthetically pleasing and aerodynamically streamlining surface with the vehicle body hood and the windshield 16.

As seen in FIG. 2, the door 22 may be bodily raised vertically to an open position by pivoting the support arm 26 upwardly about the pivot shaft 28. The attitude of the door 22 during such opening movement is controlled by a guide link 48 which has an inboard end 49 pivotally mounted on the cowl structure by a pivot shaft 50 and an outboard end 51 pivotally mounted on the door 22 by a pivot shaft 52.

Movement of the support arm 26 between the raised and lowered positions is preferably assisted by a spring mechanism or by a suitable electric or hydraulic lift mechanism. Suitable latches are provided to latch the door 22 in the closed position. The pivot shafts 28, 30, 50 and 52 extend generally parallel with each other and are spaced apart from one another to provide stable support for the door in the opened position.

As shown in FIG. 2, a support arm 60 and guide link 62 may also be provided for mounting a passenger door, not shown. It may be desirable to fill the gap between the support arms 26 and 60 with a suitable decorative and sealing structure to fill the opening and limit the inlet of water.

Referring to FIG. 2, it will be understood that the path of the bodily shifting movement of the door 22, as well as the attitude of the door in the opened position, is controlled by the relative lengths of the support arm 26 and guide link 48, as well as the placement of the pivot shafts 28, 30, 50 and 52.

Furthermore, it will be appreciated that the support arm and door of this invention are particularly well adapted to be constructed of composite plastic materials having high strength and light weight. Additionally, the cowl structure for supporting the support arm may have suitable braces and attachments which extend forwardly to the radiator support or other suitable structure of the vehicle to adequately support the support arm 26.

It will be understood that the door opening system of this invention is shown for opening and closing a vehicle front door, but is equally suitable for opening and closing a rear door. In order to open and close a rear door, the support arm would be mounted just rearwardly of the rear window of the vehicle.

The embodiments of the invention in which an exclusive property or privilege is claimed are defined as follows:

1. The combination comprising: a motor vehicle having a door opening adjacent an occupant seat and a cowl structure extending transversely across the vehicle body forward of a fixed windshield, a door for closing the door opening, a door support arm having an inboard end pivotally mounted on the cowl structure and an outboard end connected to the door so that pivotal movement of the support arm swings the door bodily between a lowered closed position and raised opened position.

2. The combination of claim 1 further characterized by the support arm being mounted on the vehicle cowl structure by a pivot located closely adjacent the centerline of the vehicle body and by the support arm being configured to fit flush with the surface of the cowl structure.

3. The combination comprising: a motor vehicle having a door opening adjacent an occupant seat and a cowl structure extending transversely across the vehicle body forward of a windshield opening, a door for closing the door opening, a door support arm having an inboard end pivotally mounted on the cowl structure and an outboard end pivotally mounted on the door so that pivotal movement of the support arm swings the door vertically between a lowered closed position and raised opened position, and a guide link having an inboard end pivotally mounted on the cowl structure and an outboard end pivotally mounted on the door so that the guide link controls the pivotal movement of the door in relation to the outboard end of the support arm.

4. The combination of claim 3 further characterized by the guide link extending generally parallel to the support arm and by the respective pivotal mountings of the ends of the support arm and the guide link being spaced apart from one another and having axes which extend parallel with one another.

* * * * *